United States Patent [19]

Thaler et al.

[11] Patent Number: 5,160,831
[45] Date of Patent: Nov. 3, 1992

[54] MULTI-MODE CONTROL CIRCUIT AND INDICATOR ARRANGEMENT FOR AN ELECTRICAL APPLIANCE

[75] Inventors: Arnold Thaler, Plantation; Ivan Saud, Miami, both of Fla.; P. C. Yip, Tsuenwan, Hong Kong

[73] Assignee: Windmere Corporation, Miami, Fla.

[21] Appl. No.: 280,365

[22] Filed: Dec. 6, 1988

[30] Foreign Application Priority Data

Jun. 7, 1988 [GB] United Kingdom ................. 1051334

[51] Int. Cl.$^5$ ............................................... H05B 1/02
[52] U.S. Cl. .................................... 219/506; 219/492; 219/240; 219/508; 219/501; 340/655
[58] Field of Search ............... 219/225, 241, 242, 250, 219/251, 221, 240, 248, 506, 494, 501, 508; 236/46 F, 15 BG; 340/655

[56] References Cited

U.S. PATENT DOCUMENTS

| | | | |
|---|---|---|---|
| 2,292,807 | 8/1942 | Waage | 219/248 |
| 4,047,058 | 9/1977 | Green | 307/293 |
| 4,347,428 | 8/1982 | Conrad et al. | 219/251 |
| 4,418,268 | 11/1983 | Munshaw | 219/242 |
| 4,673,798 | 6/1987 | Contri et al. | 219/225 |
| 4,745,260 | 5/1988 | Albinger, Jr., et al. | 219/250 |

FOREIGN PATENT DOCUMENTS

| | | | |
|---|---|---|---|
| 3133806 | 10/1982 | Fed. Rep. of Germany | 219/248 |
| 0084616 | 5/1985 | Japan | 219/248 |
| 0222099 | 11/1985 | Japan | 219/248 |

OTHER PUBLICATIONS

PPC Industries 1990 Ltd.—Circuit Working Principle by W. M. Wong Nov. 14, 1988.
Mims, III, Engineer's Notebook II, a handbook of integrated circuit applications. Radio Shack Corp., Nov. 1988.

Primary Examiner—Mark H. Paschall
Attorney, Agent, or Firm—Dickstein, Shapiro & Morin

[57] ABSTRACT

A time-based electrical appliance multi-mode control circuit and indicator arrangement which is connected to a power supply and an on and off switch. Upon turning the switch on, power is simultaneously supplied to the electrical appliance load and to a dual timer circuit. A first timer in the circuit is immediately energized causing a first indicator to represent an on state to the user. After a predetermined length of time, the first timer causes one output to go low, turning off the on state indicator and respectively turning on a ready state indicator. A second timer is then activated for a second predetermined period. At the end of the second period, the ready state indicator is turned off and the standby state indicator is turned on. At the same time, a triac connected to the electrical appliance load is turned off causing the power to the load to be automatically switched off.

16 Claims, 2 Drawing Sheets

MULTI-MODE CONTROL CIRCUIT AND INDICATOR ARRANGEMENT FOR AN ELECTRICAL APPLIANCE

BACKGROUND OF THE INVENTION

A large variety of electrical appliances are found in every home. While the presence of those appliances ensures that tasks are performed more safely and efficiently, the effectiveness of those appliances depends on controlling and indicating their operational status. For example, if an appliance is left turned on long after the user has finished with it, a child or careless adult may burn themselves on the exposed heated surfaces. Hence, an automatic control for shutting off the appliance as well as for indicating that the appliance has been shut off would avoid this and other safety risks. In addition, the controller/indicator would reduce additional wear and tear on the appliance, as well as save electricity.

Another problem created by the absence of indicators or controls stems from the fact that appliances often require a short period of time to reach a ready or operational state. In such instances, the user must periodically test the appliance to see if it is ready. By providing a control circuit for and indicator of a ready state, however, the user avoids losing the time spent testing the appliance.

Although some appliances are equipped with control and indicating circuitry that automatically turns the appliance off or indicates that the appliance is ready to use, such circuits have tended to involve relatively complex designs that have not fully solved the problems discussed above. Moreover, the appliances known in the prior art do not automatically shut off after a predetermined period of time regardless of any use during that period of time.

For example, U.S. Pat. No. 4,673,798, to Contri et al. describes a complex control and automatic shut-off circuit for an electric curling iron. The Contri et al. controller operates by measuring the actual temperature of the hair curler barrel against preset high and low temperature thresholds and indicates when those temperature levels are exceeded. In addition, the Contri et al. controller automatically shuts off the curler when a preset time period, initiated by operation of the curling iron's clamp, is exceeded. However, the Contri et al. arrangement is complex. The circuitry depends upon four factors to control and indicate two states of the appliance. In addition, the Contri et al. automatic shut-off design does not avoid potential safety risks. Because the shut-off control depends upon movement of the hair clamp, if the appliance is mistakenly dropped or manipulated by a small child, the appliance will automatically turn back on.

Other less complex circuits than Contri et al. fail to indicate or control both the ready and automatic shut-off conditions of an appliance. The Albinger, Jr. et al. patent, U.S. Pat. No. 4,745,260, for example, uses a motion sensor and electronic timer to control an automatic shut-off circuit for an electric iron. Thus, when the iron has not been moved for a predetermined period of time, the Albinger et al. device automatically turns off the appliance. However, the Albinger et al. device fails to indicate when the iron is ready for use.

The Conrad et al. patent, U.S. Pat. No. 4,347,428, provides for an electric iron having three indicator lights which respectively represent sufficient, insufficient or excessive temperature levels. Conrad et al., however, does not contain circuitry for automatically switching off the appliance after a long period of non-use.

Munshaw, U.S. Pat. No. 4,418,268, also shows an electrical appliance control having a multi-mode indicator.

However, the Munshaw controller does not automatically shut off the appliance when the appliance is not in use.

The invention set forth herein, therefore, provides for an apparatus that effectively controls and indicates an appliance's readiness and automatically shuts off the electrical appliance through a simple circuit design without the safety pitfalls outlined above.

SUMMARY AND OBJECTS OF THE INVENTION

In view of the foregoing, it should be apparent that there exists a need in the art for an electrical appliance control and indicating system that controls the on, ready and automatic shut-off states of an appliance through a safe and simple design.

It is, therefore, a primary object of the present invention to provide an automatic control for an electrical appliance having a multi-mode indicator that selectively enables three separate operational states of the appliance and clearly indicates such states to a user.

It is another object of the present invention to provide for an automatic control for an electrical appliance that operates on, ready and automatic shut-off state indicators based upon a single parameter.

It is still a further object of the present invention to provide for an automatic control for an electrical appliance in which the control circuit design is based upon two predetermined time thresholds.

It still another object of the present invention to provide for an automatic electrical appliance control using three separate indicators where the first, second and the third indicators are respectively controlled by first and second timing circuits.

It is yet a further object of the present invention to provide for an automatic control for an electrical appliance in which the time periods for the first and second timing circuits are predetermined.

It is an additional object of the present invention to provide for an automatic control for an electrical appliance where the pre-determined time periods for the timing circuits are based upon particular properties of the appliance. The time period for the first timing circuit is between 110 and 150 seconds while the time period for the second timing circuit is between 1 and 2 hours.

It is yet an additional object of the present invention to provide for an automatic control for an electrical appliance where the indicating device consists of individual lamps which are sequentially lighted in the order of the on, ready and automatic shut-off states of the appliance.

It is still another object of the present invention to provide for an automatic control for an electrical appliance in which the appliance is turned on and off by a triac connected to the second timer circuit such that the second timer circuit provides sufficient gate current to the triac until it reaches the end of a second predetermined time period. The triac is thereupon switched off, causing the electrical appliance to be deactivated.

Those and other objects are accomplished by the instant invention by means of an electrical appliance control circuit which is connected to the power supply and to the power switch. Upon turning the switch on, power is simultaneously supplied to the electrical appliance and to a dual timer circuit. A first timer causes a first on state indicator to illuminate. After a predetermined length of time, the first timer times out, switching off the first indicator and respectively turning on a second timer and a second ready state indicator. The second timer remains activated for a second predetermined period. At the end of the second time period, the second indicator turns off and the third automatic shut-off state indicator is then switched on. At the same time, the triac connected to the load of the electrical appliance is turned off, causing the appliance to be switched off. The appliance can then be restarted by manually switching it off and then switching it back on.

The three indicators are represented by three different colored lamps arranged to sequentially turn on and turn off. The operating states of the appliance are thus easily ascertained by the user. Accordingly, a simple, foolproof, multi-mode control and indicator arrangement for an electrical appliance is provided.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
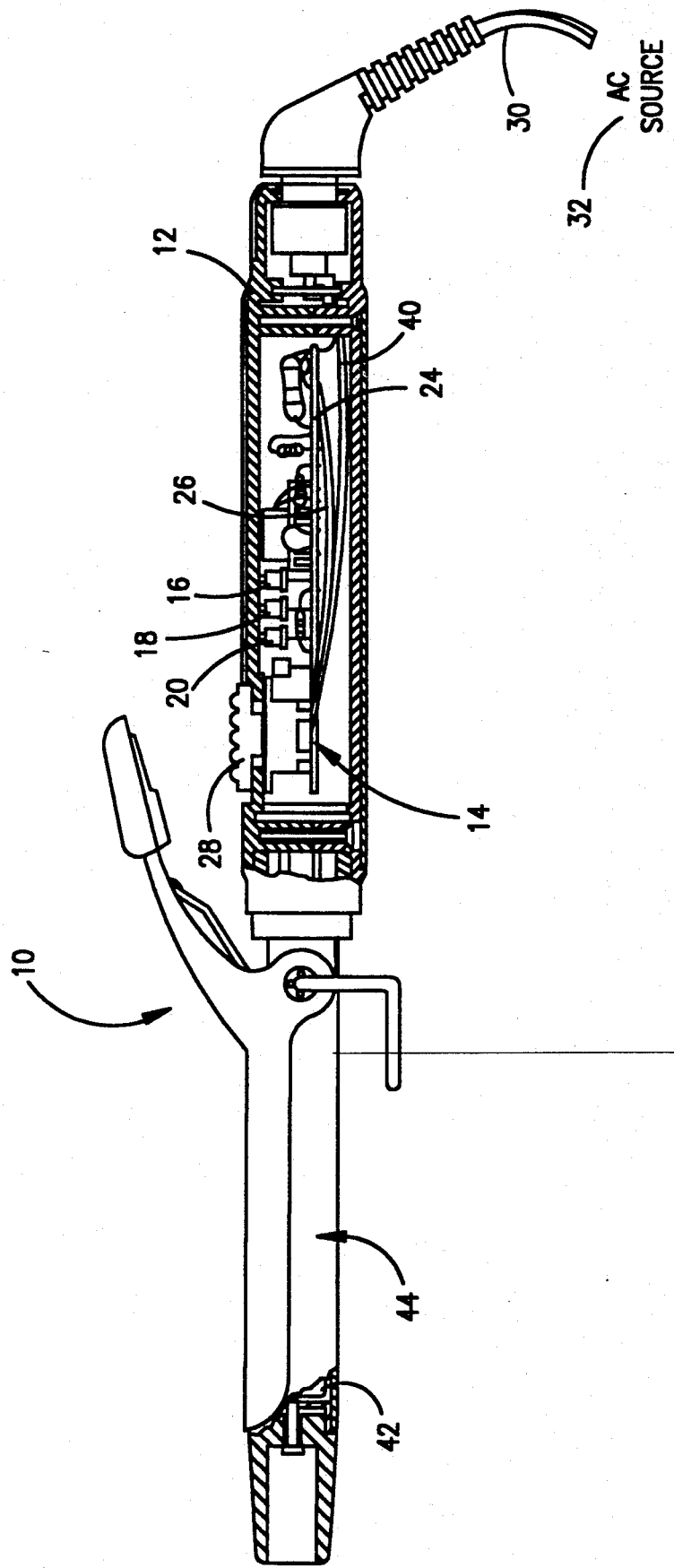
FIG. 1 is a partial cut-away side view showing the control circuit of the present invention incorporated in the handle of an electric hair curling iron.

Referring now in detail to the drawings wherein like parts are designated by like reference numerals throughout, there is illustrated in FIG. 1 a side cutaway view representing the present invention as employed in an electric hair curling iron. Although the present invention is shown in connection with a curling iron, it should be noted that any electrical appliance can be employed with this invention.

More particularly, FIG. 1 illustrates a curling iron 10 having a handle portion 12 and a barrel portion 44. The appliance receives power from an AC power source 32 and is connected to the AC source through an AC conductor line 30. The conductor line 30 is connected to a single-pole, single-throw, on and off switch 28 located in the handle portion 12. The on and off switch can be of any conventional design, i.e., such as a slide, rocker or push button switch. The switch 28 is connected by lines 26 and 40 to a power supply 24 and to a heater element 42 located in the barrel portion 44. When the power is switched on, lines 26 and 40 conduct current to the power supply 24 and to the heater element 42.

The power supply 24, in turn, is connected to a lighting circuit 14. The arrangement of the power supply 24 and lighting circuit 14 will be described in more detail below with reference to FIG. 2.

The lighting circuit 14 consists of three lamps 16, 18 and 20 which are arranged along the curling iron's handle portion 12. The lamps are selectively energized and de-energized by lighting circuit 14 in order to sequentially illuminate the on, ready and automatic shut-off (hereinafter "standby") states of the appliance. In order to better differentiate between each state, the lamps are preferably of different colors. The on lamp 16 is preferably red, the ready lamp 18 is preferably green and the standby lamp is preferably yellow. However, it is contemplated that any other suitable combination of colors may be used for the lamps.

The first lamp 16 represents the on state for the hair curling iron. Thus, when the switch 28 is in the closed or on position, power is supplied to the lighting circuit 14 causing the first lamp 16 to immediately illuminate and causing a first timer (not shown) in timing circuit 14 to start.

The second lamp 18 represents the ready state for the curling iron. The second lamp 18 is time-controlled based upon a preset period representative of the required time for the heater 42 to heat the metal barrel 44 to a sufficient temperature level for curling hair. The time period normally required to heat the barrel 44 is between 110 and 150 seconds. The length of the time period, however, can change depending upon the type of appliance used and/or the manner in which the appliance is used. A discussion of how the time period is changed is provided with reference to FIG. 2.

Once the barrel 44 is sufficiently heated for operation, the first lamp 16 and the first timer turn off and the second lamp 18 automatically turns on. The second lamp 18 remains on for a second time period controlled by a second timer (not shown) in timing circuit 14. That time period may be between 60 and 120 minutes. The second time period is also adjustable.

A third lamp 20 represents the standby state for the appliance. The third lamp 20 indicates that the heater 42 has been automatically turned off after having been left on past a predetermined time period. To reactivate the appliance from the standby state, the switch 28 must be turned to the off position and then moved back to the on position. As a result, lamps 16, 18 and 20 repeat the same lighting sequence, as described above.

It is contemplated that the timing circuit 14 and lamps 16, 18 and 20 can be used on any suitable appliance. For example, the automatic control circuit could effectively control and indicate the operational states of an electric iron or an electric hair blower. Other types of appliances could include heater-based appliances, or appliances using fans, pumps or motors.

Figure 2:
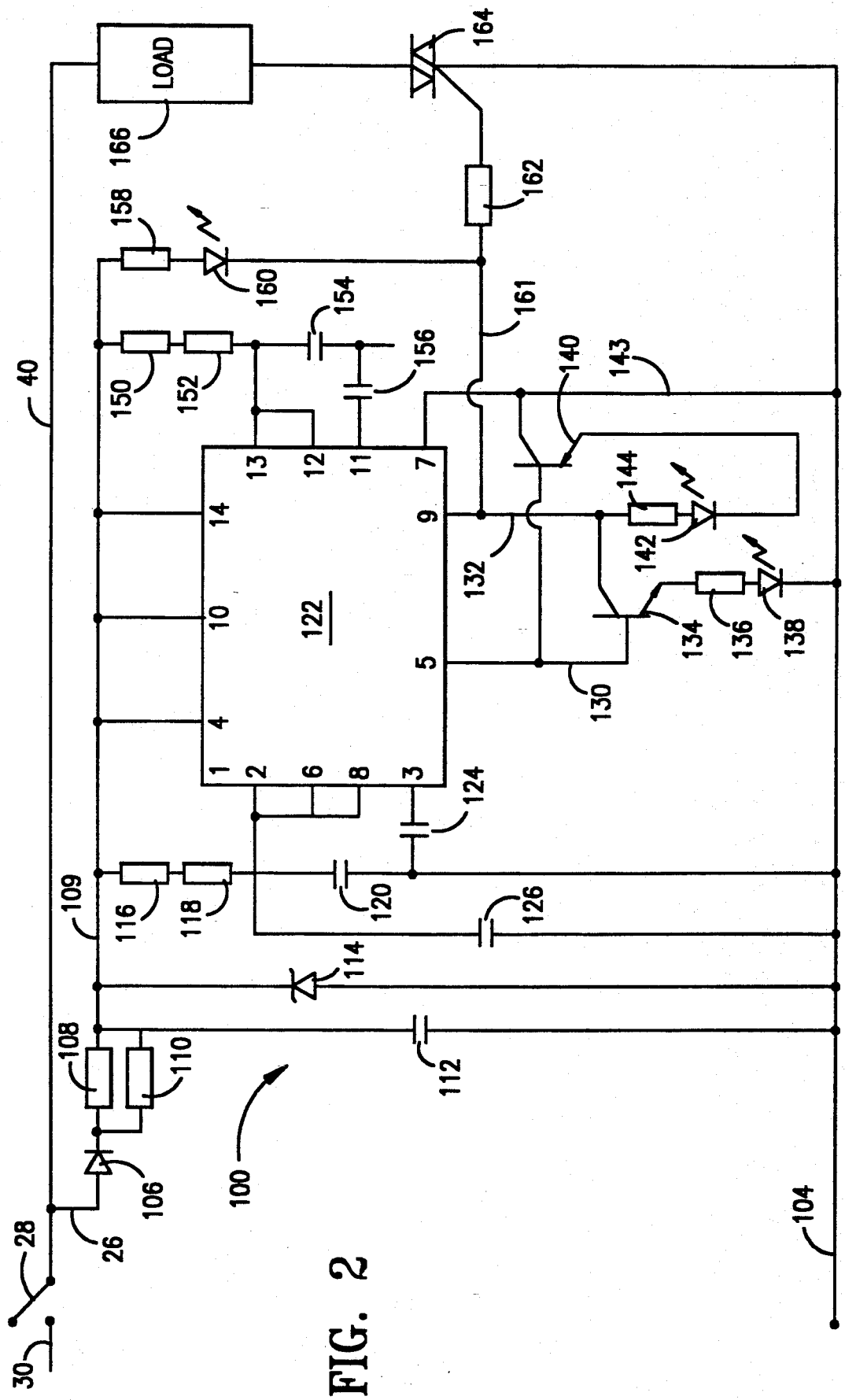
FIG. 2 is an electrical schematic diagram of the control circuit and indicator arrangement of the present invention.

FIG. 2 is an electrical circuit schematic diagram of the circuit 100 encompassing the power supply circuit 24 and lighting circuit 14 of FIG. 1.

The circuit 100 includes a 120 volt AC power line 30. The power line 30 is connected/disconnected from the circuit 100 through a switch 28. Through the arrangement of the switch 28 and the AC power supply line 30, input voltage is supplied to the load 166 (which is labelled as heater 42 in FIG. 1) along power line 40 at the same time that it is supplied to the input terminals of the power supply from power line 26.

The power supply circuit includes a diode 106, a pair of resistors 108 and 110, a capacitor 112 and a zener diode 114. The diode 106 receives AC power from the switch 28 along the line 26 and then half-wave rectifies the AC power to an appropriate DC voltage. A resistor pair 108 and 110 is connected in parallel to the diode 106. The resistors 108 and 110 act to step down the voltage level to between 4.5 and 16 volts depending on the type of circuitry chosen. The output of the resistors 108 and 110 is then presented to a capacitor 112 and a zener diode 114. The capacitor 112 and zener diode 114 are connected between the output of the resistor pair 108 and 110 and to the ground line 104. When current is presented to the capacitor 112, it acts to smooth the voltage output of the resistors about a steady state value. The zener diode 114 further limits over-voltages in order to provide a safe operating level.

The output of the power supply circuit is provided on line 109 to serial resistors 116 and 118. The resistors are connected to capacitors 120 and 126, forming an R-C network input that is connected to the timing terminals of the first clock of the integrated circuit (hereinafter "IC") 122.

The IC 122 may be a dual monolithic timing circuit Model No. SE556 or NE556. The IC 122 is capable of producing accurate time delay outputs in time increments controlled by two external resistor-capacitor networks connected respectively to two internal timers (not shown). Each resistor-capacitor network is respectively connected to input terminals 2, 6 and 8 and to input terminals 12-13 to control the threshold and trigger inputs to each of the two timers in the IC 122. As such, the IC 122 will self-trigger as soon as the capacitors 120 and 126 or 154 change state. The predetermined periods of time for each timer thus depend upon the R-C time constant of each resistor-capacitor network.

The outputs 5 and 9 of IC 122 control the energization and de-energization of the first and second indicator lights and the output 9 controls the de-energization of the load 166 of the appliance. The IC output terminal 5 is connected respectively to the base of a NPN type transistor 134 and to the base of a PNP type transistor 140. The emitter of the transistor 134 is connected to a resistor 136 and to a light-emitting diode (hereinafter "LED") 138. The IC output terminal 9 is connected to the collector of the transistor 134 and to a resistor 144 which, in turn, connects to the light-emitting diode (hereinafter "LED") 142. The collector of the transistor 140 is connected to a ground line 143. The IC output terminal 9 further connects to a resistor 162 which, in turn, connects to a triac 164. The triac 164 is connected to one side of the load of the electrical appliance, e.g., heater 42 of FIG. 1.

The third light-emitting diode 160 is connected at its other end to the power supply line 109 through a resistor 158. Control of the third LED 160 comes from a resistor-capacitor network consisting of serially connected resistors 150 and 152 and capacitor 154.

The timing circuit operates in the following manner. When the switch 28 is closed, power is provided to the IC 122, immediately triggering the first clock and causing the IC outputs 5 and 9 to go high. The high signals are presented to the collector and base of the transistor 134, providing a current path through the resistor 136 and the LED 138 to the ground line 104, which energizes the LED 138.

As soon as the capacitors 120 and 126 are charged to their threshold voltage, they cause the input voltage to increase at the input terminals 2, 6 and 8 of the IC 122. As a result, the IC output 5 of the first clock is forced low while the IC output 9 remains high. The PNP transistor 140 thereby switches on, energizing the second LED 142. The changes in state of the capacitors 120 and 126, therefore, respectively turn off the first timer. The second timer remains on. The time period for the first timer is preferably between 110 and 150 seconds. However, any time period is available by changing the resistor-capacitor time constant of the R-C network 116, 118, 120 and 126.

After approximately one to two hours, the capacitor 154 controlling the second timer becomes fully charged to its threshold voltage level. The capacitor 154 then changes state causing an increase in the voltage to the threshold input terminal 12 and discharge input terminal 13 of the IC 122 which, in turn, causes the output 9 of the IC 122 to be forced low. The transistor 140 and the respective LED 142 are subsequently turned off. At the same time, the increase in voltage causes the light-emitting diode (hereinafter "LED") 160 to switch on. The LED 160 is thereby lit at the same time that the LED 142 turns off.

As the output 9 is forced low, a decreased current path through resistor 162 causes the triac 164 to switch off. The power to the load 166 is thereby removed, causing the load of the appliance to automatically shut off. Hence, the change in the state of the capacitor 154 turns off power to the load 166, turns on the stand-by state LED 160 and turns off the ready state LED 142.

The capacitors 124 and 156 each operate to smooth any voltage to the input terminals 3 and 11 of IC 122.

In order to reactivate the timing circuit 100, the switch 28 must be opened and then closed a second time, causing the timing circuit to repeat the same sequence described above.

The timing circuit 100, therefore, operates an on state indicator 138, a ready state indicator 142 and a standby state indicator 160 in sequence, based upon predetermined time periods set by the dual clock timer chip and associated resistor-capacitor networks.

The circuit of the present invention can be applied to numerous electrical devices. For example, the device can be used for operating an oven, an electric iron or a hair blower. The circuit is also useful in representing the states of motor-operated appliances such as household fans, air conditioners, humidifiers or dehumidifiers.

Although only a preferred embodiment is specifically illustrated and described herein, it will be appreciated that many modifications and variations of the present invention are possible in light of the above teachings and within the purview of the appended claims without departing from the spirit and intended scope of the invention.

We claim:

1. A control circuit for an electrical appliance comprising:
   first indicating lamp for representing first condition for said electrical appliance;
   second indicating lamp for representing a second condition for said electrical appliance;
   third indicating lamp for representing a third condition for said electrical appliance;
   first timing means connected to said first indicating and second indicating lamps, which, upon reaching a first predetermined time threshold, extinguishes said first indicating lamp and turns on said second indicating lamp; and
   second timing means connected to said second and third indicating lamps and an operative element of said electrical appliance such that, upon reaching a second predetermined time threshold, said second timing means extinguishes said second indicating lamp, deactivates said operative element of said electrical appliance and turns on said third indicating lamp.

2. The control circuit according to claim 1, wherein said first, second and third indicating means respectively comprise individual lamps.

3. The control circuit according to claim 1, wherein said lamps are sequentially switched on and off by at least one of said first and second timing means.

4. The apparatus according to claim 1, further including electronic switch means connected to said second timing means for turning off said operative element of said electrical appliance after said second timing means reaches a second predetermined time threshold.

5. The control circuit according to claim 1, wherein said first predetermined time threshold is between 110 and 150 seconds.

6. The control circuit according to claim 1, wherein said second predetermined time threshold is between one and two hours.

7. The control circuit according to claim 1, wherein said first predetermined time threshold corresponds to the amount of time required to put said operative element of said electrical appliance into an operational state.

8. The control circuit according to claim 1, wherein said first indicating means is connected to the output of said first timing means through a first electronic switching means such that, upon reaching the end of said first predetermined time, said output of said first timing means causes said first electronic switching means to extinguish said first indicating means.

9. The control circuit according to claim 1, wherein said second indicating means is connected to said first and second timing means through a second electronic switching means such that when said first timing means reaches its pre-determined time threshold, said second electronic switching means is switched on, activating said second indicating means.

10. The control circuit according to claim 9, wherein said third indicating means is connected to said second timing means such that when said second timing means switches off, said third indicating means is activated.

11. The control circuit according to claim 1, wherein said electrical appliance comprises an electric hair curling iron.

12. The control circuit according to claim 11, wherein said first, second and third indicating means comprise three LED's disposed along a handle of said electric hair curling iron.

13. The control circuit according to claim 12, wherein said first, second and third indicating means operate in respective sequential order to indicate the on state, ready state, and standby state of said electric hair curling iron.

14. A method of controlling an electrical appliance having an operative element, comprising the steps of:
activating a first indicator means upon the turning on of said operative element of said electrical appliance;
activating a first timer means for a first pre-determined time period simultaneously with the activation of said first indicator means;
extinguishing said first indicator means and activating a second indicator means for a second pre-determined time period;
extinguishing said second indicator means and then activating a third indicator means at the expiration of said second pre-determined time period; and
deactivating said operative element of said electrical appliance simultaneously with the activation of said third indicator means.

15. A control circuit for an electrical appliance comprising:
first, second and third indicating means for respectively indicating three different states of said electrical appliance;
activating/deactivating means for said first, second and third indicating means, said activating/deactivating device including first and second timing means such that at least two of said indicating means are time-based upon said first and second timing means; and
said activating/deactivating means further including a device for deactivating an operative element of said electrical appliance.

16. A control circuit for an electrical appliance comprising:
first indicating lamp for representing a first condition for said electrical appliance;
second indicating lamp for representing a second condition for said electrical appliance;
third indicating lamp for representing a third condition for said electrical appliance, said first, second and third conditions being different conditions for said electrical appliance;
first timing means connected to said first and second indicating lamps, which, upon reaching a first pre-determined time threshold, extinguishes said first indicating lamp and turns on said second indicating lamp; and
second timing means connected to said second and third indicating lamps and an operative element of said electrical appliance such that, upon reaching a second predetermined time threshold, said second timing means extinguishes said second indicating lamp, deactivates said operative element of said electrical appliance and turns on said third indicating lamp.

* * * * *